United States Patent [19]

Shirasaki et al.

[11] 4,257,040
[45] Mar. 17, 1981

[54] ENGINE ROTATIONAL INFORMATION DETECTING APPARATUS

[75] Inventors: Shinji Shirasaki, Kariya; Katsuhiro Ohta, Funabashi; Takao Sugisaki, Ichikawa, all of Japan

[73] Assignees: Nippondenso Co., Ltd., Kariya; TDK Electronics Co., Ltd., Tokyo, both of Japan

[21] Appl. No.: 20,926

[22] Filed: Mar. 15, 1979

[30] Foreign Application Priority Data

Apr. 28, 1978 [JP] Japan .................................. 53-51786

[51] Int. Cl.³ .................. G01P 3/44; H02K 24/00; G08B 21/00
[52] U.S. Cl. .................................. 340/671; 324/174
[58] Field of Search .................. 340/671, 672, 195; 178/53, 53.1 R; 324/173, 174; 73/519

[56] References Cited

U.S. PATENT DOCUMENTS

| | | | |
|---|---|---|---|
| 3,742,243 | 6/1973 | Gamble | 324/174 |
| 3,842,299 | 10/1974 | Lombard | 340/671 |
| 3,930,201 | 12/1975 | Ackermann et al. | 340/195 |
| 4,028,686 | 6/1977 | Wilson et al. | 340/671 |
| 4,072,893 | 2/1978 | Huwyler | 340/671 |

*Primary Examiner*—Thomas A. Robinson
*Attorney, Agent, or Firm*—Cushman, Darby & Cushman

[57] ABSTRACT

An apparatus for detecting information indicative of the rotation of an engine is disclosed in which a multiplicity of magnetic poles are formed on a track along the circumferential periphery of a rotating member driven by an engine, thus detecting a rotational reference position and a rotational angle from the rotational reference position of the engine. A rotational reference sensor and an angle sensor for generating a signal representing a change in magnetic fluxes by detection of the magnetic fluxes from the track are arranged in opposition to the track in spaced relation from each other along the axis of the rotating member. Some of the magnetic poles on the track which are opposed to the rotational reference sensor are omitted, so that a signal representing the rotational reference position is generated in the case where the angle sensor detects magnetic fluxes but the rotational reference sensor fails to detect the same.

10 Claims, 12 Drawing Figures

FIG. 1
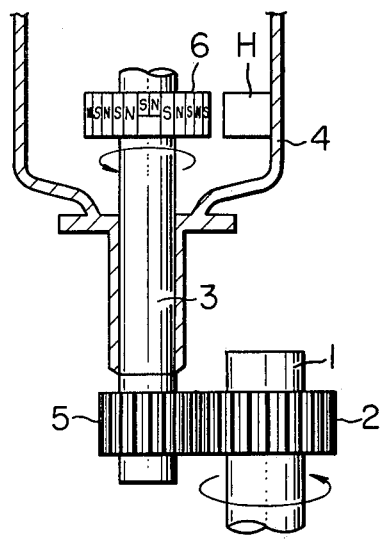
FIG. 2A
FIG. 2B
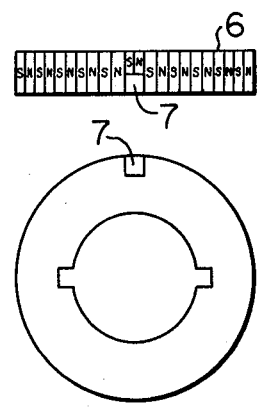
FIG. 3A
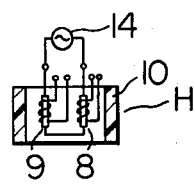
FIG. 3B
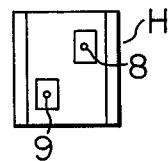
FIG. 4
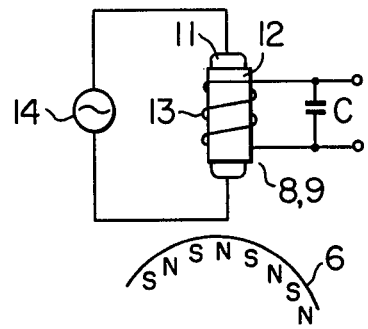
FIG. 5
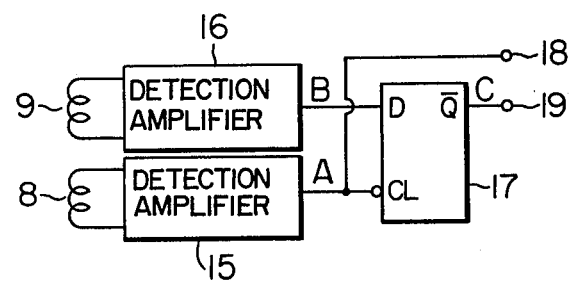

FIG. 6
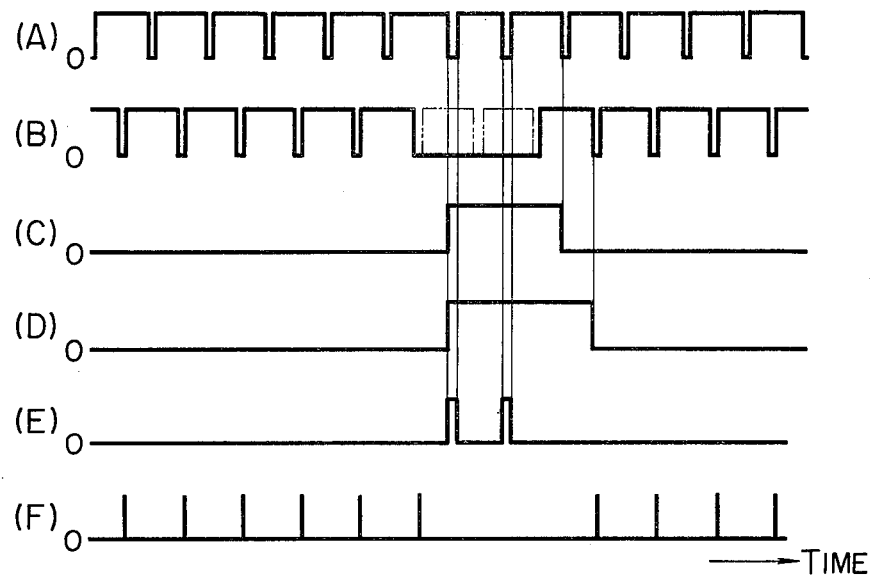
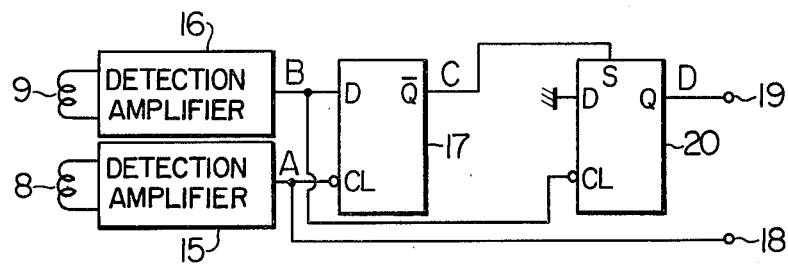
FIG. 7
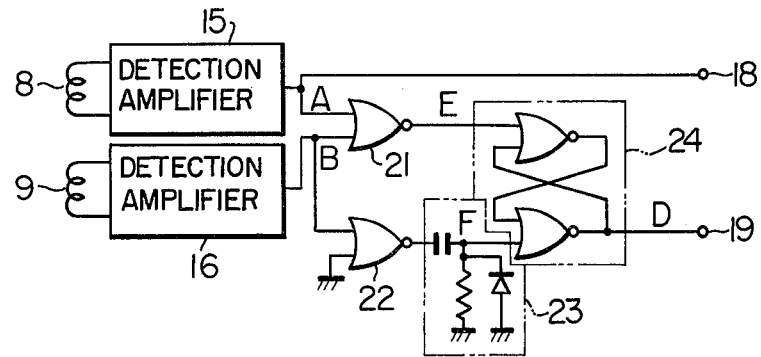
FIG. 8
FIG. 9
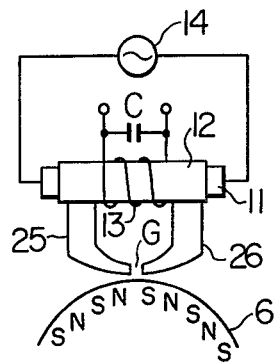
FIG. 10
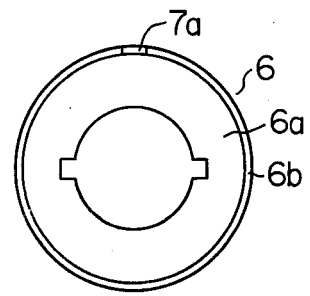

ENGINE ROTATIONAL INFORMATION DETECTING APPARATUS

BACKGROUND OF THE INVENTION

1. Field of the Invention

The present invention relates to an apparatus for detecting information indicative of the rotation of an engine which detects a rotational reference position of an engine and a rotational angle with respect to the rotational reference position.

2. Description of the Prior Art

In a conventional rotational information detecting apparatus of this type, a multiplicity of magnetic poles are formed on one track along the circumference of a rotating member to provide information as to an angle or angular information, and magnetic poles independent of the angular information are formed on a different track to provide reference information on the rotation of the rotating member. The angular information and rotational reference information are detected by the angle sensor and the rotational reference sensor respectively.

In view of the fact that the angular information and the rotational reference information are formed independently of each other on different tracks, it is difficult to synchronize the detection signal for the angular information with that of the reference rotational information, resulting in a displacement of detection between the angular and rotational reference information. Further, it is necessary to shield the sensors from each other in order to prevent the detection signal for one sensor from affecting that for the other.

SUMMARY OF THE INVENTION

Accordingly, it is an object of the present invention to provide an apparatus for detecting information on the rotation of an engine, in which the detection signal for any one sensor is very little affected by the information of the other sensor. A multiplicity of magnetic poles providing angular information are formed on the circumference of a rotating member along the axis thereof in opposed relation to both the angle sensor and the rotational reference sensor. Some of the magnetic poles opposed to the rotational reference sensor are omitted by forming a slot, thereby generating rotational reference information. In this way, the rotational reference information is easily formed on the one hand and the position of the rotational reference information formed on the rotating member is easily recognized by the slot on the other hand. Further, the detection signal for the angular information is accurately synchronized with that for the rotational reference information.

According to the present invention, a multiplicity of magnetic poles providing angular information are formed on the circumference of a rotating member along the axis thereof in opposed relation to both the angular sensor and the rotational reference sensor, and part of the magnetic poles which are opposed to the rotational reference sensor is omitted by forming a slot to provide rotational reference information. As a result, only by forming a slot at part of the magnetic poles providing the angular information, the rotational reference information is generated easily. Also, the position of the rotational reference information formed on the rotary member is easily known from the slot. Further, part of the angular information is utilized as the rotational reference information on the one hand and the detection signal for the angular information is accurately synchronized with that for the rotational reference information on the other hand. Furthermore, the detection signal for one sensor is rarely affected by the information of the other sensor. Still another advantage of the invention lies in that the outer periphery of the rotating member is substantially circular and need not be formed in complicated form.

BRIEF DESCRIPTION OF THE DRAWINGS

FIG. 1 is a longitudinal sectional view schematically showing part of a first embodiment of the apparatus according to the present invention.

FIGS. 2A and 2B are front and plan views of the rotating member shown in FIG. 1.

FIGS. 3A and 3B are partially longitudinal sectional view and a front view schematically showing the rotation detecting head of the apparatus shown in FIG. 1.

FIG. 4 is a diagram showing a basic configuration of the sensor of the apparatus shown in FIG. 1.

FIGS. 5, 7 and 8 are electric circuit diagrams showing first to third embodiments of the apparatus according to the present invention.

FIG. 6 shows waveforms produced at various parts for explaining the operation of the apparatus shown in FIGS. 5, 7 and 8.

FIG. 9 is a diagram showing another basic configuration of the sensor of the apparatus shown in FIG. 1.

FIG. 10 is a plan view showing another example of the rotating member of the apparatus of FIG. 1.

DESCRIPTION OF THE PREFERRED EMBODIMENTS

The present invention will be described below with reference to the embodiments shown in the drawings. A first embodiment of the apparatus according to the present invention is illustrated in FIGS. 1 to 5. First, referring to FIG. 1, an embodiment of the mounting condition will be explained. Reference numeral 1 denotes a cam shaft rotated in synchronism with engine rotation, numeral 2 a gear fixed on the cam shaft 1, numeral 3 a distributor shaft rotatably held to a distributor housing 4. Numeral 5 denotes a gear secured to the distributor shaft 3 and engaged with the gear 2, numeral 6 a rotating member fixed on the distributor shaft 3 in the distributor housing 4, and character H a rotation detecting head fixed in the housing 4 in opposition to the circumference of the rotating member 6.

The rotating member 6 is constructed as shown in FIGS. 2A and 2B and comprises a disc of a magnetic material such as ferrite having a multiplicity of magnetic poles magnetized to N and S alternately over the entire circumferential periphery thereof, thus providing a multiplicity of angular information. A recessed slot 7 as long as half the axial length of the disc, i.e., the width thereof is formed to replace a pair of N and S magnetic poles. By forming this slot 7, those of the magnetic poles associated with the rotational reference information, among all the magnetic poles formed around the circumference of the rotating member 6, are omitted. The slot 7 may be formed either before or after magnetization of the magnetic poles, but if it is formed before magnetization of the magnetic poles, it is useful for positioning for magnetization.

The rotation detecting head H is constructed as shown in FIGS. 3A and 3B. Numerals 8 and 9 show the angle sensor and the rotational reference sensor respectively. The sensors 8 and 9 are arranged within the detector case 10 at positions displaced in an axial direction (in the vertical direction of FIG. 3B) from each other by a fixed length in a manner to be opposed to the upper and lower halves of the circumference of the rotating member 6 and also at positions displaced in the circumferential direction (in the lateral direction of FIG. 3B) by a fixed length to displace the phases of the output signals of the sensors 8 and 9 from each other. Resin is filled in the case 10. The sensors 8 and 9, which generate a detection signal in response to the magnetic fluxes from the magnetic poles of the rotating member 6, may comprise a magnetic line sensor, a Hall element sensor, a magnetic reluctance element sensor or an electromagnetic induction sensor. In this embodiment, explanation will be made with reference to the most desirable case in which the magnetic line sensor is used.

The magnetic line sensor is well known and the basic configuration thereof is shown in FIG. 4. The surface of the core conductor 11 of phosphor bronze is plated with a magnetic thin film 12 of permalloy to form a thin film magnetic line wound with a coil 13, thus facilitating the magnetization in the circumferential direction. When current is applied to the core conductor 11 from the exciting circuit 14, no output voltage is produced between the terminals of the winding 13 in the absence of a magnetic field in the axial direction of the magnetic thin film 12, i.e., the axial direction in which magnetization is difficult; while in the presence of a magnetic field, an output voltage is produced between the terminals of the winding 13.

A circuit configuration is shown in FIG. 5. Numerals 15 and 16 denote detection amplifiers for producing a rectangular wave output as shown in (A) and (B) of FIG. 6 by detection and amplification of the output signals of the sensors 8 and 9. In (A) and (B) of FIG. 6, when a "1" output signal is generated it shows that the sensors 8 and 9 are opposed to pole N or S; while the sensors 8 and 9 are opposed to the intermediate part between N and S poles when a "0" output signal is generated. The two-dot chain in (B) of FIG. 6 shows the condition in which the rotational reference sensor 9 is opposed to the slot 7. Numeral 17 shows a data flip-flop. Suitable flip-flops such as integrated circuit type CD 4013, manufactured by RCA Corporation, are well known. To the clock terminal of the data flip-flop 17 a reversed rectangular wave signal from the detection amplifier 15 is applied, while a rectangular wave signal from the detection amplifier 16 is applied to the data terminal of the flip-flop 17. The output of detection amplifier 15 is connected to the angular signal terminal 18, and the output terminal $\overline{Q}$ of the data flip-flop 17 is connected to the reference signal terminal 19.

Next, the operation of the apparatus according to the present invention having the above-mentioned configuration will be explained. With the rotation of the engine, the rotating member 6 rotates, so that magnetic fluxes from a multiplicity of magnetic poles on the circumference of the rotating member 6 cause the sensors 8 and 9 produce output signals containing high frequency components. The output signals from the sensors 8 and 9 are shaped by the detection amplifiers 15 and 16, thus generating rectangular output signals as shown in (A) and (B) of FIG. 6. Since the sensors 8 and 9 are displaced by a predetermined length in the circumferential direction from each other, the phases of the output signals of the detection amplifiers 15 and 16 are also displaced accordingly by one half cycle. The angle sensor 8 is opposed to the upper half of the outer periphery of the rotating member 6, and a multiplicity of magnetic poles are formed continuously on the upper half of the outer periphery of the rotating member 6. Therefore, the detection amplifier 15 produces a continuous output signal as shown in (A) of FIG. 6. On the other hand, the rotational reference sensor 9 is opposed to the lower half of the outer periphery of the rotating member 6, and those magnetic poles associated with the rotational reference data among the multiplicity of magnetic poles on the lower half of the outer periphery of the rotating member 6 are omitted. Thus, the detection amplifier 16 produces an output signal partially omitted, as shown in (B) of FIG. 6. The output signal generated at the detection amplifier 15 is taken out as an angular signal from the angular signal terminal 18. Take 48 as the number of N poles and 48 as that of S poles of the rotary member 6, and then 96 rectangular wave pulses are generated at the angular signal terminal 18 for every rotation of the rotary member 6.

The output signal from the detection amplifier 15 is applied in a reversed form to the clock terminal of the data flip-flop 17, while the output signal of the detection amplifier 16 is applied directly to the data input terminal of the data flip-flop 17. Therefore, in response to each fall of the rectangular wave signal from the detection amplifier 15 the signal state of the detection amplifier 16 is stored in the data flip-flop 17. A reversed signal of the stored input is produced from the $\overline{Q}$ output terminal of the data flip-flop 17. Therefore, the "1" output signal is produced as shown in (C) of FIG. 6, only in response to the fall to "0" from "1" of the output signal of the detection amplifier 15 when a "0" signal is produced from the detection amplifier circuit 16 with the rotational reference sensor 9 opposed to the slot 7 of the rotating member 6. The above-mentioned "1" signal is taken out as a rotational reference signal from the reference signal terminal 19.

The rotational reference signal from the reference signal terminal 19 and the angular signal from the angular signal terminal 18 are used as a reference position signal, an angle counting signal or a rotational speed detection signal required for operation of the electronic ignition advancing device and the electronic fuel injection device or the like.

A second embodiment of the present invention is shown in FIG. 7. As compared with the first embodiment shown in FIG. 5, an additional data flip-flop 20 is inserted. The set terminal of the data flip-flop 20 is connected with the $\overline{Q}$ output terminal of the data flip-flop 17, the data terminal thereof is grounded, the output terminal of the detection amplifier 16 is connected in reversed form to the clock terminal of the flip-flop 20, and the Q output terminal of the flip-flop 20 is connected to the reference signal terminal 19. According to this embodiment, output signals as shown in (A), (B) and (C) of FIG. 6 are produced at the output terminals of the detection amplifiers 15 and 16 and the output terminal $\overline{Q}$ of the data flip-flop 17 similarly to the embodiment shown in FIG. 5. In response to the rise of the output signal of the $\overline{Q}$ output terminal of the data flip-flop 17 to "1" level, the data flip-flop 20 is set, and the Q output terminal thereof becomes "1" level as shown in (D) of FIG. 6. Thereafter, when the output signal of the $\overline{Q}$ output terminal of the data flip-flop 17 is reduced to "0" level, and when subsequently the output signal of the detection amplifier 16 to be reduced to "0" level, the "0" input at the data terminal of the data flip-flop 20 is stored in the data flip-flop 20, and the signal level at the Q output terminal thereof is reduced to "0" level as shown in (D) of FIG. 6. The output signal shown in (D) of FIG. 6 is produced as a reference signal from the reference signal terminal 19, therefore, the fall of the reference signal coincides with the fall of the output signal of the detection amplifier 16.

A third embodiment of the invention is shown in FIG. 8. As in the second embodiment of FIG. 7, a reference signal as shown in (D) of FIG. 6 is produced by the circuit of the third embodiment. The outputs of the detection amplifiers 15 and 16 are connected to the inputs of the NOR circuit 21 which produces an output signal as shown in (E) of FIG. 6. The output of the detection amplifier 16, on the other hand, is connected to one input of the NOR circuit 22. The NOR circuit 22 operates as an inverter circuit to invert the output signal of the detection amplifier 16. Numeral 23 denotes a differentiator circuit including a capacitor and a diode and the differentiator circuit 23 produces a differentiated output signal as shown in (F) of FIG. 6 in response to the rise of the output of the NOR circuit 22. Numeral 24 denotes an R-S flip-flop including two NOR circuits. The output signal shown in (E) of FIG. 6 from the NOR circuit 21 is applied to the set input of the flip-flop 24, and to the reset input thereof the output signal shown in (F) of FIG. 6 from the differentiator circuit 23 is applied. As a result, an output signal as shown in (D) of FIG. 6 is produced at the output terminal of the R-S flip-flop 24 connected to the reference signal terminal 19.

In the embodiments illustrated above, the magnetic thin film 12 of the sensors 8 and 9 is arranged radially with respect to the rotating member 6. As shown in FIG. 9, however, one pair of the ends of the yokes 25 and 26 of magnetic material may alternatively be made to contact both ends in an axial direction of the magnetic thin film 12, the other pair of the ends of the yokes 25 and 26 are opposed to each other through an air gap G, and the air gap G between the yokes 25 and 26 are opposed to the magnetic poles of the rotating member 6, thus, the magnetic thin film 12 of the sensors 8 and 9 is arranged in tangential direction with respect to the rotating member 6.

In the above-mentioned embodiments, the rotating member 6 is made of a disc of magnetic material on the periphery of which a multiplicity of magnetic poles are magnetized. As an alternative, as shown in FIG. 10, the disc 6a and the belt-like magnetic recording medium 6b such as magnetic tape formed on the circumferential periphery of the disc 6a by bonding or like means may constitute the rotating member 6. A multiplicity of magnetic poles are magnetized on this belt-like magnetic recording medium 6b, and a slot for providing rotational information may be made up of a recess 7a formed in the recording medium 6b. In another alternative, the disc 6a is formed of a non-magnetic material, on the circumferential periphery of which is coated a film of the magnetic recording medium 6b, thus making up a rotating member 6.

Furthermore, instead of omitting one pair of the magnetic poles as in the above-mentioned embodiments, only one pole or more than two poles may be omitted to form a slot for providing the rotational data.

We claim:

1. An apparatus for obtaining angular and reference information relating to a cyclically varying phenomenon, comprising:

a rotating member associated with said cyclically varying phenomenon, said rotating member including a circumferential periphery having a multiplicity of magnetic poles, each of said magnetic poles being formed on the circumferential periphery over an axial length thereof, a slot being formed on said circumferential periphery by omitting a portion of some of said magnetic poles, the width of said slot being at least a width of a pair of magnetic poles;

an angle sensor disposed opposite said circumferential periphery for producing an output signal in response to magnetic fluxes produced by said magnetic poles;

a rotational reference sensor disposed opposite said circumferential periphery and axially displaced from said angle sensor, for producing an output signal in response to magnetic fluxes produced by said magnetic poles, wherein said omitted portion of some of said magnetic poles is a portion of a part of said magnetic poles disposed opposite said rotational reference sensor, and said slot provides rotational reference information;

an angular signal generator circuit for generating an angular signal in response to an output signal from said angle sensor; and a reference signal generator circuit for producing a rotational reference signal from output signals from said angle sensor and said rotational reference sensor.

2. An apparatus according to claim 1, wherein said rotating member includes a disc of magnetic material, said magnetic poles for providing the angular information being formed by magnetizing said disc of magnetic material, and said slot for providing rotational reference information being constructed with a recess formed in the circumferential periphery of said disc of magnetic material.

3. An apparatus according to claim 1, wherein said rotating member includes a disc and a belt-like magnetic recording medium provided on the circumferential periphery of said disc, said magnetic poles for providing the angular information being formed by magnetizing said belt-like magnetic recording medium, said slot for providing said rotational reference information being constructed with a recess formed in said belt-like magnetic recording medium.

4. An apparatus according to any of claims 1, 2 or 3, wherein said angle sensor and said rotational reference sensor are arranged such that said sensors are displaced from each other in the circumferential direction to make the phases of output signals of angular information detected by said sensors deviate from each other, and wherein said reference signal generator circuit is connected to said angle sensor and said rotational reference sensor for producing a reference pulse in synchronism with inversion intervals of the output signal of said angle sensor when said rotational reference sensor has detected the arrival of said slot.

5. An apparatus for obtaining angular and reference information relating to a cyclically varying phenomenon, comprising:

a rotating member associated with said cyclically varying phenomenon, said rotating member having a plurality of magnetic portions extending over the axial length thereof, said magnetic portions having magnetic poles arranged in alternating polarity on at least one surface of said rotating member; said rotating member further having at least one slot therein for omitting a portion of at least one pair of adjacent magnetic portions for defining a reference part, the portion of said at least one pair of adjacent magnetic portions not omitted defining an angle part;

an angle sensor disposed in magnetic proximity with said angle part for obtaining an output signal in response to magnetic fluxes produced by magnetic poles associated with said angle part;

a rotational reference sensor disposed in magnetic proximity with said reference part for obtaining an output signal in response to magnetic fluxes produced by magnetic poles associated with said reference part, said slot providing rotational reference information; and means responsive to the respective output signals of said angle sensor and said rotational reference sensor for obtaining an angular signal and a rotational reference signal.

6. The apparatus of claim 5 wherein said magnetic poles are arranged on the circumferential part of said rotating member, whereby said slot omits a portion of at least one pair of adjacent magnetic poles of opposite polarity.

7. The apparatus of claim 6 wherein said rotating member comprises a disk of magnetic material having said slot in the circumferential periphery thereof, said magnetic poles being provided by magnetizing said disk.

8. The apparatus of claim 6 wherein said rotating member comprises a disk of non-magnetic material and a web of magnetic material connected to the periphery of said disk, said magnetic poles being provided by magnetizing said web, and said slot being provided by a recess in said web.

9. The apparatus of claim 5 wherein said angle sensor and said rotational reference sensor are circumferentially displaced from one another for providing a predetermined phase relationship between the respective output signals thereof.

10. The apparatus of claims 5, 6, 7, 8 or 9 wherein said signal obtaining means is responsive to the respective output signals of said angle sensor and said rotational reference sensor for obtaining said rotational reference signal having a pulse in synchronism with inversion intervals of said angle signal when the output of said rotational reference sensor is indicative of said slot.

* * * * *